(Model.)
J. A. KENDALL.
CREAMING CAN.
No. 296,416. Patented Apr. 8, 1884.
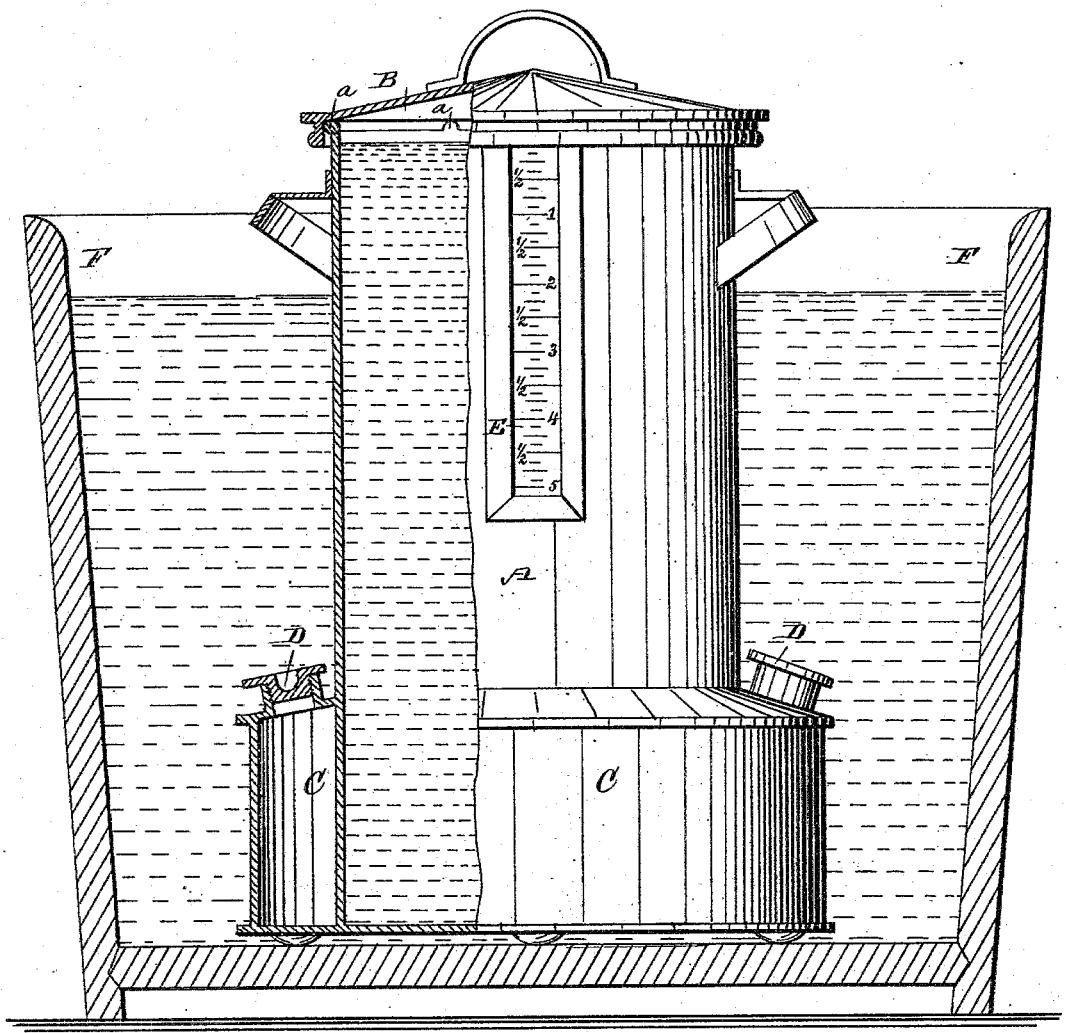
WITNESSES:
Theo. G. Hoster
B. G. Underwood.
INVENTOR:
J. A. Kendall
BY Munn & Co.
ATTORNEYS.

UNITED STATES PATENT OFFICE.

JOHN A. KENDALL, OF HAMILTON, MISSOURI.

CREAMING-CAN.

SPECIFICATION forming part of Letters Patent No. 296,416, dated April 8, 1884.

Application filed August 11, 1883. (Model.)

*To all whom it may concern:*

Be it known that I, JOHN A. KENDALL, of Hamilton, in the county of Caldwell and State of Missouri, have invented a new and Improved Creaming-Can, of which the following is a full, clear, and exact description.

The object of my invention is to provide a new and improved device for raising the cream contained in milk.

The invention consists of the detailed construction and combination of parts, substantially as hereinafter fully set forth and claimed.

Reference is to be had to the accompanying drawing, forming a part of this specification, in which the figure is an elevation of my improved cream-raiser, parts being broken out and others being shown in section, the cream-raiser being shown in a tank filled with water, which tank is also shown in section.

A can, A, provided with a cover, B, of the usual construction, except with aperture for the escape of steam and heat, is provided at its lower part with a closed annular chamber, C, which is provided with openings in its top closed by screw-plugs D. The can is provided with a graduated glass scale, E, through which the thickness of the layer of cream can be seen. The chamber C is filled with warm water; or it can be filled with air only. The can A is placed in a tub or vessel, F, filled with cold water. The warm water in the chamber C, or the air in the said chamber, which air is a poor conductor of heat, prevents the milk in the lower part of the can from being cooled by the cold water in the tank, or by the cold air if the can is placed in a cold place. The cooling of the milk in the can takes place from the top to bottom, thereby keeping up a motion of the milk from the bottom to the top, the warm milk in the bottom rising and cooler milk on top descending, and so on until a mean temperature is reached between the milk and the water in the tank. The specific gravity of cream is so near that of milk having a slightly-higher temperature that if cans are cooled alike at the top and bottom, the warmer milk will always be on top and the cooler milk at the bottom, and the particles of cream contained in the cooler milk at the bottom cannot rise and the cream will not be thoroughly raised; whereas in my improved cream-raiser it can be raised very rapidly, and no cream will be left in the milk. The cover is larger than the vessel, and rests upon a few drops of solder, *a*, on the upper edge of the vessel, so that heat and steam can escape through the outlet thus formed.

I am aware that broadly it is not new to provide an inner vessel or chamber with an outer surrounding chamber extending under the bottom of said vessel, to provide a receptacle with an upper chamber surrounding a neck of said receptacle, to employ an inner vessel surrounded throughout its length by an outer chamber, and to place a close vessel within an inner open receptacle surrounded by an outer open receptacle of greater height than the inner open receptacle.

I am further aware that it is not new to provide a can with an external upper ice-chamber to the bottom of which is connected the upper end of a lower annular drip-water chamber.

Having thus described my invention, I claim as new and desire to secure by Letters Patent—

The milk-can A, provided at its lower part with the closed annular warm-water or air chamber C integral therewith, said chamber having openings and plugs for said openings, in combination with the cold-water vessel F, as and for the purpose described.

JOHN A. KENDALL.

Witnesses:
CROSBY JOHNSON,
FRANK BROTHERS.